(12) United States Patent
Huang et al.

(10) Patent No.: US 7,838,774 B2
(45) Date of Patent: Nov. 23, 2010

(54) LOW AC LOSS SINGLE-FILAMENT SUPERCONDUCTOR FOR A SUPERCONDUCTING MAGNET AND METHOD OF MAKING SAME

(75) Inventors: Xianrui Huang, Clifton Park, NY (US); Minfeng Xu, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 1159 days.

(21) Appl. No.: 11/419,335

(22) Filed: May 19, 2006

(65) Prior Publication Data

US 2007/0270314 A1 Nov. 22, 2007

(51) Int. Cl.
*H01B 12/00* (2006.01)

(52) U.S. Cl. .................................... 174/125.1; 505/231

(58) Field of Classification Search ................. 174/15.4, 174/15.5, 125.1; 505/230–232
See application file for complete search history.

(56) References Cited

U.S. PATENT DOCUMENTS

| 4,336,420 | A | | 6/1982 | Benz |
| 5,200,577 | A | * | 4/1993 | Shimada ................. 174/125.1 |
| 6,036,774 | A | | 3/2000 | Lieber et al. |
| 6,510,604 | B1 | * | 1/2003 | Pourrahimi ................. 29/599 |
| 7,053,740 | B1 | | 5/2006 | Laskaris et al. |
| 7,268,099 | B1 | | 9/2007 | de Rochemont |
| 7,463,915 | B2 | | 12/2008 | Thieme et al. |

OTHER PUBLICATIONS

"A Low AC Loss Superconductor for a Superconducting Magnet and Method of Making Same", U.S. Appl. No. 11/419,331, filed May 19, 2006.

* cited by examiner

*Primary Examiner*—Jeremy C Norris
(74) *Attorney, Agent, or Firm*—Scott J. Asmus

(57) ABSTRACT

A low AC loss electrical conductor includes a plurality of single-filament superconducting strands longitudinally wound about one another. An insulative housing surrounds the plurality of single-filament superconducting strands.

15 Claims, 3 Drawing Sheets

LOW AC LOSS SINGLE-FILAMENT SUPERCONDUCTOR FOR A SUPERCONDUCTING MAGNET AND METHOD OF MAKING SAME

BACKGROUND OF THE INVENTION

The invention relates generally to superconducting magnet systems and more particularly to superconducting magnets operating in an alternating current (AC) environment.

In one example, an MR system includes a cold mass comprises a superconducting magnet, a magnet coil support structure, and a helium vessel. Liquid helium contained in the helium vessel provides cooling for the superconducting magnet and maintains the superconducting magnet at a low temperature for superconducting operations, as will be understood by those skilled in the art. The liquid helium maintains the superconducting magnet approximately and/or substantially at the liquid helium temperature of 4.2 Kelvin (K). For thermal isolation, the helium vessel that contains the liquid helium in one example comprises a pressure vessel inside a vacuum vessel.

An MR superconducting magnet typically includes several coils, a set of primary coils that produce a uniform $B_0$ field at the imaging volume, and a set of bucking coils that limit the fringe field of the magnet. These coils are wound with superconductors such as NbTi or Nb3Sn conductors. The magnet is cooled down to liquid helium temperature (4.2 K) so that the conductors are operated at their superconducting state. The heat loads of the magnet, such as that produced by the radiation and conduction from the environment, are removed by either the boil-off of liquid helium in an "open system" or by a 4 K cryocooler in a "closed system". The magnet is typically placed in a cryostat to minimize its heat loads since the replacement of liquid helium is expensive and since the cooling power of a cryocooler is limited. If the coils are exposed to an AC field such as an AC field generated by gradient coils of the MR system, AC losses are generated in the superconductors. That is, when superconducting coils are exposed to an AC field, hysteresis loss and eddy currents are induced therein that contribute to AC losses, which can raise the conductor temperatures and potentially cause a quench. The AC losses also add to the total heat load for the refrigeration system. A rise in heat load requires additional cryogenic refrigeration power, which increases operating costs.

It would therefore be desirable to have an apparatus configured to reduce AC losses caused by hysteresis loss and eddy currents induced in superconducting magnet coils.

BRIEF DESCRIPTION OF THE INVENTION

The present invention provides a superconductor for reducing AC losses in superconducting coils that overcomes the aforementioned drawbacks.

In accordance with one aspect of the invention, a low AC loss electrical conductor is disclosed and includes a plurality of single-filament superconducting strands longitudinally wound about one another. The electrical conductor also includes an insulative housing configured to enclose the plurality of single-filament superconducting strands.

In accordance with another aspect of the invention, a method of constructing a conductor is also presented and includes forming a plurality of single-strand superconductors including surrounding a single-strand superconducting filament core with a copper layer and placing an insulation coating around the copper layer. The method also includes winding the plurality of single-strand superconductors about one another and placing the wound plurality of single-strand superconductors inside an insulation jacket.

In accordance with yet another aspect of the invention, a superconducting cable that includes a plurality of superconducting bundles arranged in an insulative jacket. Each superconducting bundle is comprised of a plurality of single-filament superconducting strands wound about one another.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
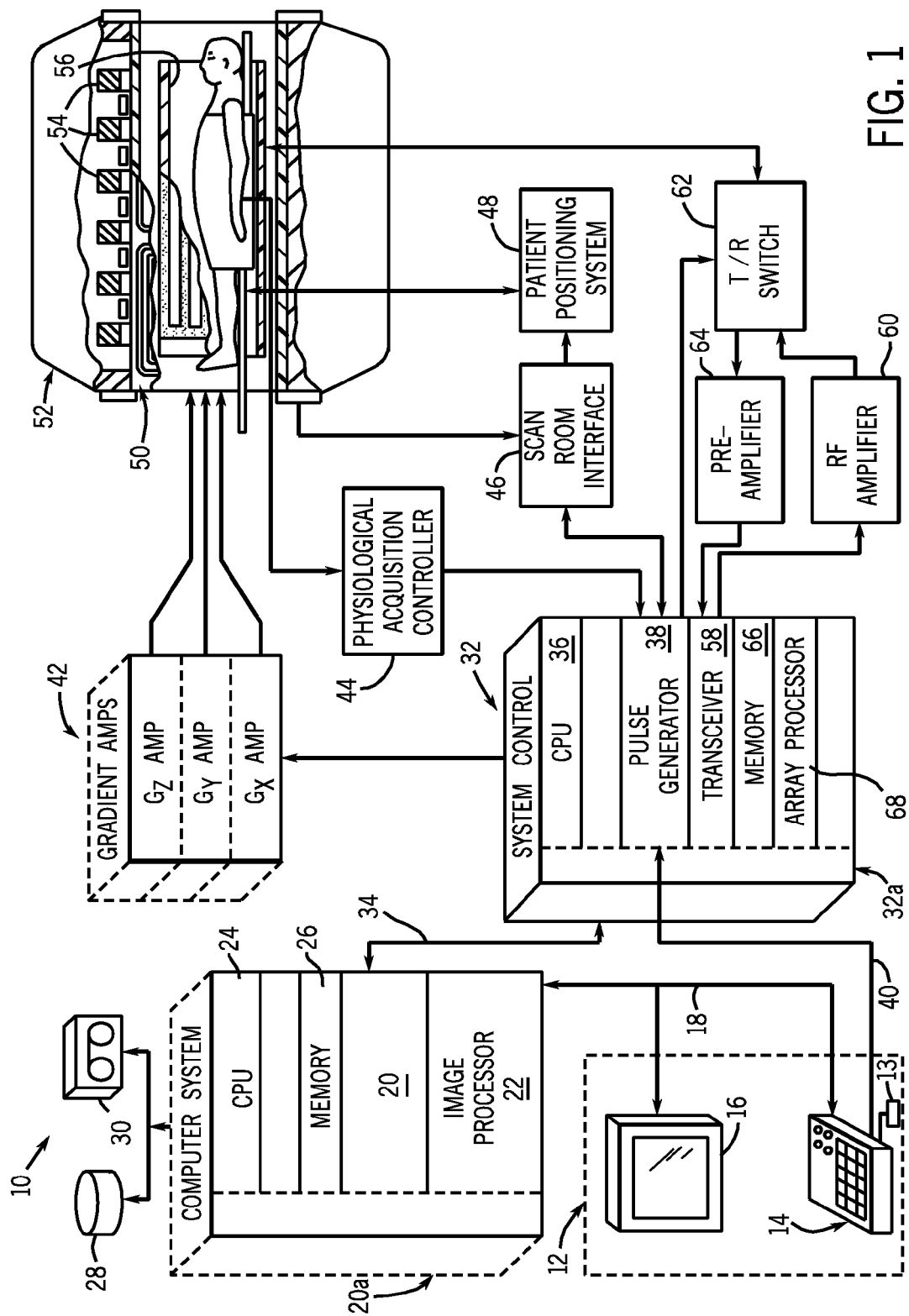
FIG. 1 is a schematic block diagram of an MR imaging system that can benefit from incorporation of the present invention.

Referring to FIG. 1, superconducting magnet system 10 in an example comprises a superconducting magnet systems operating in an alternating current (AC) environment. Exemplary superconducting magnet systems comprise a transformer, a generator, a motor, superconducting magnet energy storage (SMES), and/or a magnetic resonance (MR) system. Although a conventional MR magnet operates in a DC mode, some MR magnets may operate under an AC magnetic field from the gradient coils when the gradient leakage field to the magnet is high. Such an AC magnetic field generates AC losses in the magnet. An illustrative discussion of exemplary details of a magnetic resonance and/or magnetic resonance imaging (MRI) apparatus and/or system are presented, for explanatory purposes.

The operation of the MR system is controlled from an operator console 12 which includes a keyboard or other input device 13, a control panel 14, and a display screen 16. The console 12 communicates through a link 18 with a separate computer system 20 that enables an operator to control the production and display of images on the display screen 16. The computer system 20 includes a number of modules which communicate with each other through a backplane 20a. These include an image processor module 22, a CPU module 24 and a memory module 26, known in the art as a frame buffer for storing image data arrays. The computer system 20 is linked to disk storage 28 and tape drive 30 for storage of image data and programs, and communicates with a separate system control 32 through a high speed serial link 34. The input device 13 can include a mouse, joystick, keyboard, track ball, touch activated screen, light wand, voice control, or any similar or equivalent input device, and may be used for interactive geometry prescription.

The system control 32 includes a set of modules connected together by a backplane 32a. These include a CPU module 36 and a pulse generator module 38 which connects to the operator console 12 through a serial link 40. It is through link 40 that the system control 32 receives commands from the operator to indicate the scan sequence that is to be performed. The pulse generator module 38 operates the system components to carry out the desired scan sequence and produces data which indicates the timing, strength and shape of the RF pulses produced, and the timing and length of the data acquisition window. The pulse generator module 38 connects to a set of gradient amplifiers 42, to indicate the timing and shape of the gradient pulses that are produced during the scan. The pulse generator module 38 can also receive patient data from a physiological acquisition controller 44 that receives signals from a number of different sensors connected to the patient, such as ECG signals from electrodes attached to the patient. And finally, the pulse generator module 38 connects to a scan room interface circuit 46 which receives signals from various sensors associated with the condition of the patient and the magnet system. It is also through the scan room interface circuit 46 that a patient positioning system 48 receives commands to move the patient to the desired position for the scan.

The gradient waveforms produced by the pulse generator module 38 are applied to the gradient amplifier system 42 having Gx, Gy, and Gz amplifiers. Each gradient amplifier excites a corresponding physical gradient coil in a gradient coil assembly generally designated 50 to produce the magnetic field gradients used for spatially encoding acquired signals. The gradient coil assembly 50 forms part of a magnet assembly 52 which includes a polarizing magnet 54 and a whole-body RF coil 56. A transceiver module 58 in the system control 32 produces pulses which are amplified by an RF amplifier 60 and coupled to the RF coil 56 by a transmit/receive switch 62. The resulting signals emitted by the excited nuclei in the patient may be sensed by the same RF coil 56 and coupled through the transmit/receive switch 62 to a preamplifier 64. The amplified MR signals are demodulated, filtered, and digitized in the receiver section of the transceiver 58. The transmit/receive switch 62 is controlled by a signal from the pulse generator module 38 to electrically connect the RF amplifier 60 to the coil 56 during the transmit mode and to connect the preamplifier 64 to the coil 56 during the receive mode. The transmit/receive switch 62 can also enable a separate RF coil (for example, a surface coil) to be used in either the transmit or receive mode.

The MR signals picked up by the RF coil 56 are digitized by the transceiver module 58 and transferred to a memory module 66 in the system control 32. A scan is complete when an array of raw k-space data has been acquired in the memory module 66. This raw k-space data is rearranged into separate k-space data arrays for each image to be reconstructed, and each of these is input to an array processor 68 which operates to Fourier transform the data into an array of image data. This image data is conveyed through the serial link 34 to the computer system 20 where it is stored in memory, such as disk storage 28. In response to commands received from the operator console 12, this image data may be archived in long term storage, such as on the tape drive 30, or it may be further processed by the image processor 22 and conveyed to the operator console 12 and presented on the display 16.

Figure 2:
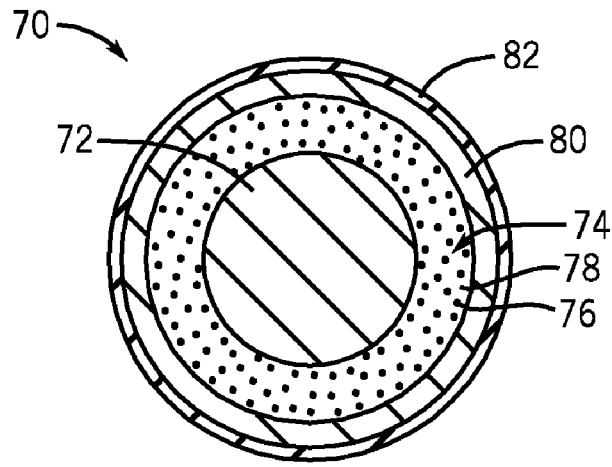
FIG. 2 is a cross-section view of a superconductor in accordance with the present invention.

FIG. 2 shows a cross-section of a superconducting electrical conductor 70 having low AC losses in an AC field. Conductor 70 has a copper core 72 radially surrounded by a first layer 74 having a plurality of superconducting filaments 76 forming a superconductor filament bundle disposed in a copper matrix 78. The filaments 76 are preferably constructed of niobium-titanium (NbTi); however, one skilled in the art will appreciate that the filaments 76 may be constructed of other superconducting materials. The filaments 76 are twisted longitudinally within the first layer 74 about the copper core 72. Preferably, the twist pitch of the plurality of superconducting filaments 76 is greater than or equal to 100 mm. The filaments 76 are also, preferably, a few microns in diameter such that hysteresis losses are reduced due to a high AC field magnitude.

When the conductor 70 is exposed to increasing AC frequencies, electrical conduction therein begins to concentrate in the first layer 74. As such, the electrical conduction skin depth of the conductor 70 decreases. The skin depth can be calculated by:

$$t = \sqrt{\frac{\rho}{\pi f \mu}}, \quad \text{(Eqn. 1)}$$

where $\rho$ is the resistivity, $\mu$ is the permeability, and $f$ is the frequency. Electrical resistance between the filaments 76 and the copper matrix 78 is proportionally related to AC losses. That is, the lower the electrical resistance between the filaments 76 and the copper matrix 78, the lower the skin depth of the electrical conduction. As the skin depth decreases, the eddy currents induced in the electrical conduction decreases. As such, the AC losses caused by induced eddy currents are also reduced.

An outer shell 80 surrounds the first layer 74, and an insulation coating 82 surrounds the outer shell 80. The outer shell 80, if conductive, can produce significant AC losses, especially at high frequencies. The outer shell 80 is, therefore, preferably constructed of resistive materials, such as CuNi or CuMn, to reduce induced eddy currents and AC losses. The insulation coating 82 insulates one conductor 70 from another or the conductor 70 from itself when wrapped on top of itself. In this manner, each conductor 70 or portion thereof acts individually in generating AC losses.

Figure 3:
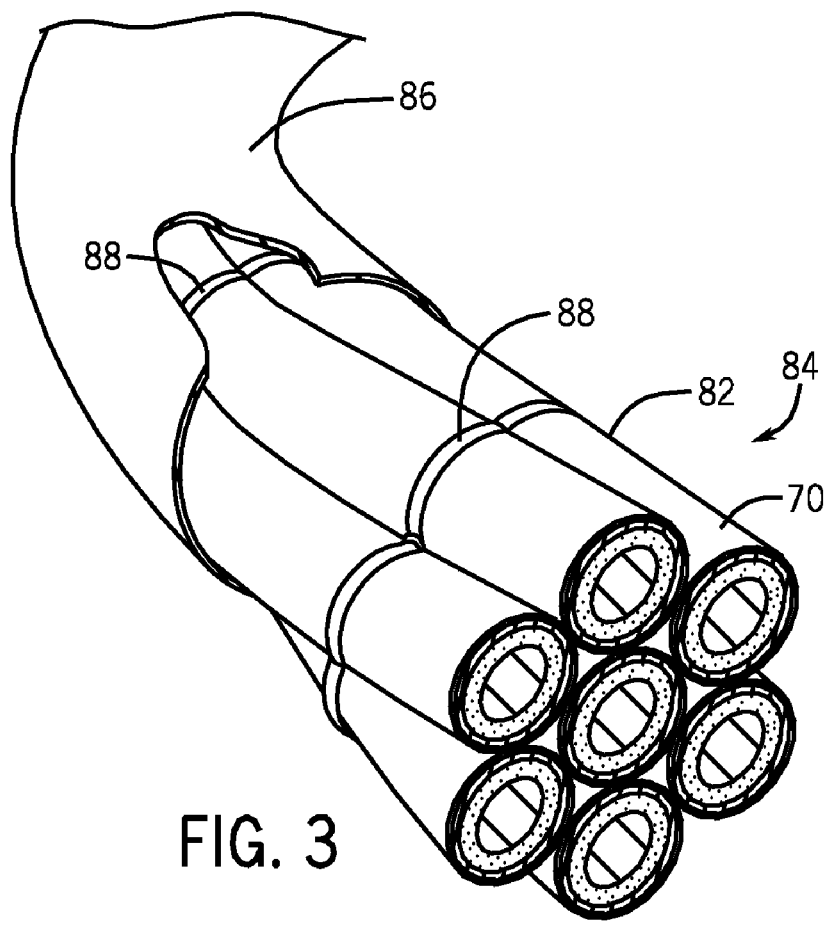
FIG. 3 is a perspective cutaway view of a plurality of the superconductors of FIG. 2 bundled together.

FIG. 3 shows a bundle 84 of conductors 70 of FIG. 2 inside an insulative sleeve 86. At higher frequencies, as the diameter of each conductor 70 is reduced, AC losses caused by eddy currents induced therein are also reduced. Each conductor 70 in the bundle 84 is in parallel with the other conductors 70, and the number of conductors 70 in the bundle 84 may be increased such that the bundle 84 carries a desired current. Preferably, a portion of the insulation coating 82 of each conductor 70 is removed, and a bridge 88 is soldered to each conductor 70 at the site of the removed insulation coating 82 such that the conductors 70 are electrically connected to one another. A number of bridges 88 is periodically soldered to the conductors 70 along a length of the bundle 84. Electrically connecting the conductors 70 together in this manner enhances current transfer and sharing therebetween and improves stability and quench performance of the bundle 84.

Figure 4:
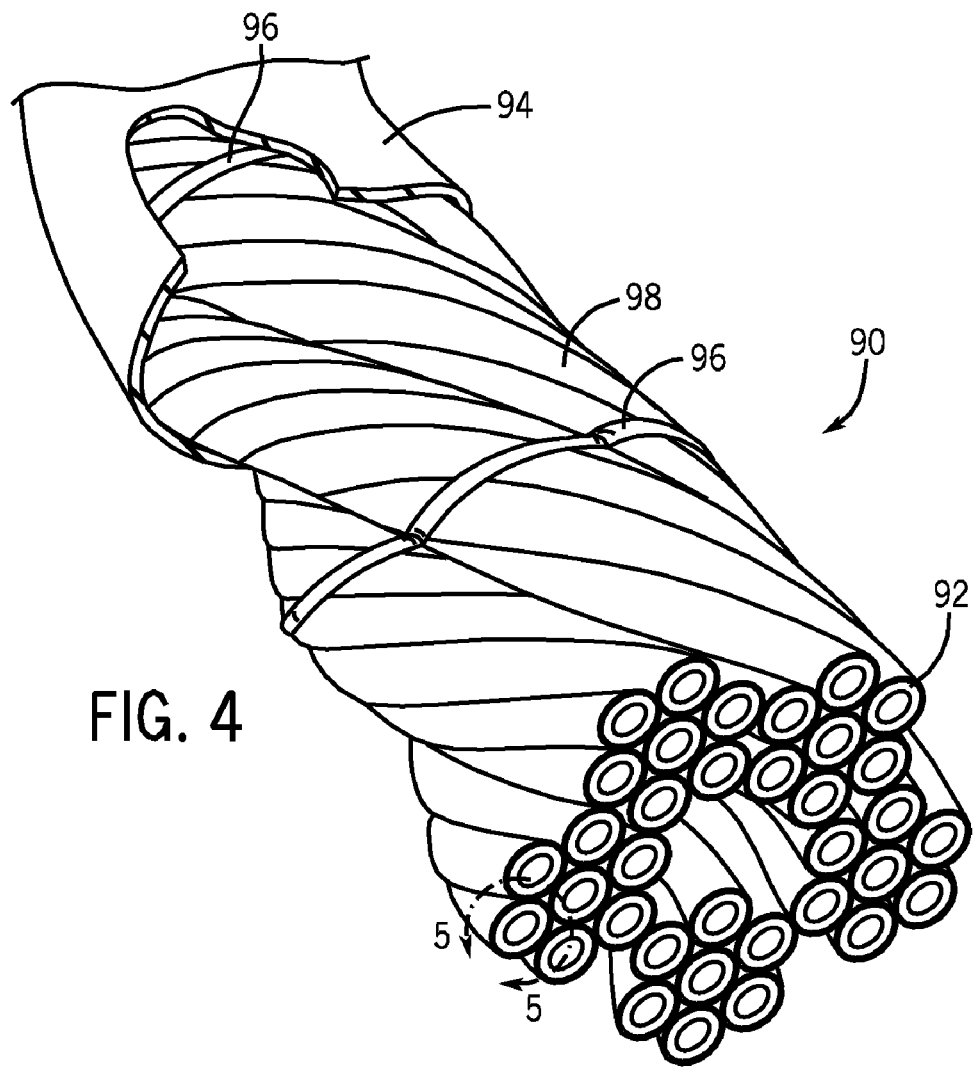
FIG. 4 is a perspective cutaway view of a plurality of superconducting strands in accordance with the present invention.

FIG. 4 shows a bundle 90 of insulated single-filament superconducting strands 92. The strands 92 are wound together in a Litz-type arrangement and bundled together via an insulation jacket 94. The strands 92 are preferably fully transposed inside the insulation jacket 94. To reduce AC losses generated in each strand 92, the diameter thereof may be reduced, for example, to less than 0.15 mm. The strands 92 conduct current in parallel such that the bundle 90 carries a desired current.

A number of bridges 96 is periodically soldered to the strands 92 along a length of the bundle 90. In this manner, a portion of an insulation coating 98 of each strand 92 is removed, and a bridge 96 is soldered to each strand 92 at the site of the removed insulation coating 98 such that the strands 92 are electrically connected to one another. The bridges 96 enhance current transfer and sharing between the strands 92 and improves stability and quench performance of the bundle 90.

Figure 5:
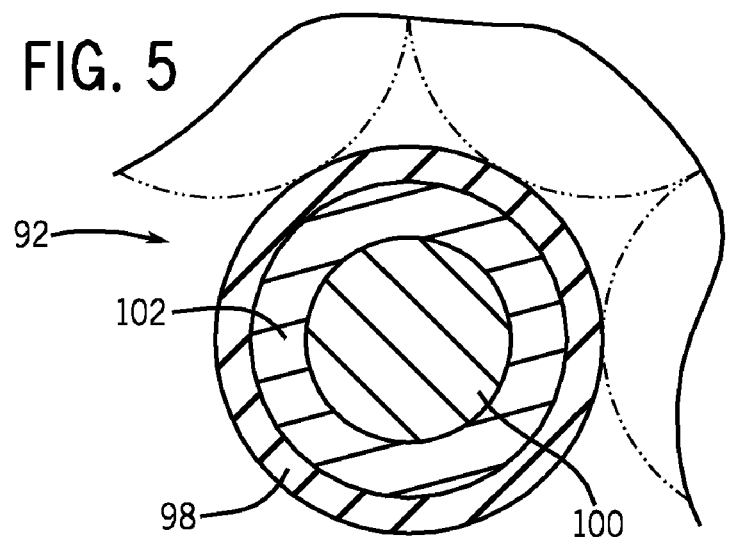
FIG. 5 is a cross-section view of a superconducting strands of FIG. 4 along line 5-5.

FIG. 5 shows a cross-section of one single-filament superconducting strand 92 along line 5-5 of FIG. 4. Strand 92 has a single superconducting filament 100 surrounded by a copper stabilizer 102. The strand 92 is preferably constructed of NbTi; however, one skilled in the art will appreciate that the strand 92 may be constructed of other superconducting materials. To insulate one strand 92 from another, the stabilizer 102 is surrounded by insulation coating.

A superconducting coil constructed of the conductor 70 and/or bundles 84, 90 as described above reduces AC losses generated by induced eddy currents. AC losses are reduced in an MR superconducting magnet under a gradient pulsing AC field and in superconducting armature or field coils of a high speed generator or motor.

Therefore, a low AC loss electrical conductor is disclosed and includes a plurality of single-filament superconducting strands longitudinally wound about one another. The electrical conductor also includes an insulative housing configured to enclose the plurality of single-filament superconducting strands.

A method of constructing a conductor is also presented and includes forming a plurality of single-strand superconductors including surrounding a single-strand superconducting filament core with a copper layer and placing an insulation coating around the copper layer. The method also includes winding the plurality of single-strand superconductors about one another and placing the wound plurality of single-strand superconductors inside an insulation jacket.

The present invention is also embodied in a superconducting cable that includes a plurality of superconducting bundles arranged in an insulative jacket. Each superconducting bundle is comprised of a plurality of single-filament superconducting strands wound about one another.

The present invention has been described in terms of the preferred embodiment, and it is recognized that equivalents, alternatives, and modifications, aside from those expressly stated, are possible and within the scope of the appending claims.

What is claimed is:

1. A low-loss AC electrical conductor comprising:
a plurality of single-filament superconducting strands longitudinally wound about one another forming strand bundles, wherein the strand bundles are longitudinally wound about one another; and
an insulative housing configured to enclose the plurality of single-filament superconducting strands.

2. The conductor of claim 1 further comprising a layer of copper surrounding each of the plurality of single-filament superconducting strands.

3. The conductor of claim 2 further comprising an insulation layer enclosing the layer of copper of each of the plurality of single-filament superconducting strands.

4. The conductor of claim 3 further comprising a plurality of electrical shunts interconnecting the plurality of single-filament superconducting strands together, the plurality of electrical shunts spaced apart from one another along a length of the plurality of single-filament superconducting strands.

5. The conductor of claim 1 wherein the plurality of single-filament superconducting strands are formed of niobium-titanium (NbTi).

6. The conductor of claim 1 wherein the plurality of single-filament superconducting strands are fully disposed within the insulative housing.

7. The conductor of claim 1 wherein a diameter of each of the plurality of single-filament superconducting strands is less than 0.15 mm.

8. The conductor of claim 1 incorporated into a magnetic resonance system.

9. A superconducting cable comprising:
a plurality of superconducting bundles arranged in an insulative jacket; and
wherein each superconducting bundle is comprised of a plurality of single-filament superconducting strands wound about one another forming strand bundles, wherein the strand bundles are longitudinally wound about one another.

10. The cable of claim 9 further comprising a copper layer radially enclosing each of the plurality of single-filament superconducting strands.

11. The cable of claim 10 further comprising an outer insulation jacket enclosing the copper layer of each of the plurality of single-filament superconducting strands.

12. The cable of claim 10, further comprising a central copper core, wherein the copper layer with the plurality of single-filament superconducting strands are disposed about the core.

13. The cable of claim 10, further comprising an outer shell of resistive material disposed about the copper layer with the plurality of single-filament superconducting strands.

14. The cable of claim 9 wherein the cable includes a plurality of solder bridges electrically connecting each of the plurality of single-filament superconducting strands together.

15. The cable of claim 9 wherein the plurality of single-filament superconducting strands are formed of niobium-titanium (NbTi).

* * * * *